(12) United States Patent
Fu et al.

(10) Patent No.: US 11,215,875 B2
(45) Date of Patent: Jan. 4, 2022

(54) DISPLAY DEVICE AND BACKLIGHT MODULE

(71) Applicant: TCL CHINA STAR OPTOELECTRONICS TECHNOLOGY CO., LTD, Guangdong (CN)

(72) Inventors: Linlin Fu, Guangdong (CN); Dehua Li, Guangdong (CN); Xin Zhang, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/043,022

(22) PCT Filed: Jul. 6, 2020

(86) PCT No.: PCT/CN2020/100399
§ 371 (c)(1),
(2) Date: Sep. 29, 2020

(65) Prior Publication Data
US 2021/0373387 A1    Dec. 2, 2021

(30) Foreign Application Priority Data
Jun. 2, 2020  (CN) .......................... 202010488278.3

(51) Int. Cl.
*G02F 1/13357*    (2006.01)

(52) U.S. Cl.
CPC .. *G02F 1/133611* (2013.01); *G02F 1/133603* (2013.01); *G02F 1/133606* (2013.01)

(58) Field of Classification Search
None
See application file for complete search history.

(56) References Cited

U.S. PATENT DOCUMENTS

| 2010/0177499 | A1 | 7/2010 | Kuromizu et al. |
| 2010/0214510 | A1 | 8/2010 | Kuromizu |
| 2021/0003874 | A1 | 1/2021 | Chen et al. |

FOREIGN PATENT DOCUMENTS

| CN | 101688648 | A | 3/2010 |
| CN | 101749668 | A | 6/2010 |
| CN | 101821547 | A | 9/2010 |
| CN | 101994951 | A | 3/2011 |
| CN | 109188777 | A | 1/2019 |
| CN | 110221476 | A | 9/2019 |
| CN | 209821564 | U | 12/2019 |

*Primary Examiner* — Britt D Hanley
(74) *Attorney, Agent, or Firm* — Mark M. Friedman

(57) ABSTRACT

The present invention provides a display device and a backlight module. The backlight module includes a substrate, an ink layer, and a plurality of light-emitting units, wherein the substrate includes a first end and a second end oppositely arranged, the ink layer is disposed on the substrate, the ink layer includes a plurality of hollow-carved units arranged gradually from the first end to the second end, and at least two light-emitting units are disposed on the ink layer in an array arrangement.

20 Claims, 2 Drawing Sheets

DISPLAY DEVICE AND BACKLIGHT MODULE

FIELD OF INVENTION

The present disclosure relates to the field of display technology, and more particularly, to a display device and a backlight module.

BACKGROUND OF INVENTION

A backlight of traditional low-end liquid crystal display devices turns on when light is turned on, and turns off when the light is turned off. A brightness and darkness adjustment of final images depends on a liquid crystal display layer blocking the light. However, due to limitations of various actual processes, materials, etc., a contrast ratio can reach up to 5000:1, and a visual effect of images displayed by above contrast ratio is unideal. Traditional mid-range liquid crystal display devices will also achieve local dimming products with dozens to hundreds of partitions, which can better improve a certain contrast. However, because a number of partitions is limited by light-emitting diode pitch (LED interval), etc., a halo often occurs in a display effect, which affects viewing quality.

Hence, mini light-emitting diode (mini LED) technology was invented. Mini LED products can achieve thousands or even tens of thousands of partitions and increase the contrast ratio to 1 million: 1, which realizes the best display of light and dark contrast, providing an immensely better quality than traditional display products.

At present, a current of mini LED backlight modules is injected through a single aspect. As a distance of wirings increases, IR drop will occur, so that a brightness of the backlight module close to a power inlet is greater than a brightness of the backlight module away from the power inlet, resulting in a problem of uneven display of the brightness in a surface of the backlight module.

Thus, it is necessary to propose a new technical solution to solve the above technical problems.

SUMMARY OF INVENTION

An embodiment of the present disclosure provides a display device and a backlight module, which is configured to improve a problem of uneven display of brightness in a surface of the backlight module due to a brightness of the backlight module close to a power inlet being greater than a brightness of the backlight module away from the power inlet.

The present disclosure provides a backlight module. The backlight module comprises a substrate, wherein the substrate comprises a first end and a second end oppositely arranged; an ink layer, wherein the ink layer is disposed on the substrate, and the ink layer comprises a plurality of hollow-carved units arranged gradually from the first end to the second end; and a plurality of light-emitting units, wherein at least two light-emitting units are disposed on the ink layer in an array arrangement.

In the backlight module provided by the present disclosure, in a column of the hollow-carved units in a direction perpendicular to a direction from the first end to the second end, a number of the hollow-carved units gradually decreases from the first end to the second end.

In the backlight module provided by the present disclosure, in two adjacent columns of the hollow-carved units, an interval between two adjacent hollow-carved units in a same column close to the first end is less than an interval between two adjacent hollow-carved units in a same column away from the first end.

In the backlight module provided by the present disclosure, in a column of the hollow-carved units in a direction perpendicular to a direction from the first end to the second end, an area of any one of the hollow-carved units gradually decreases from the first end to the second end.

In the backlight module provided by the present disclosure, a ratio of a sum of an area of the hollow-carved units in a same column at the second end to a sum of an area of the hollow-carved units in a same column at the first end ranges from 0.05 to 0.3.

In the backlight module provided by the present disclosure, the backlight module comprises an optical film, the optical film is disposed on the light-emitting units, and is used for transmitting light emitted by the light-emitting unit.

In the backlight module provided by the present disclosure, the optical film comprises a plurality of dot structures distributed in an array, and at least one of the light-emitting units corresponds to a center of the dot structures distributed in the array.

In the backlight module provided by the present disclosure, the dot structures comprise a plurality of protrusions, and at least two of the protrusions are arranged in an array.

In the backlight module provided by the present disclosure, the ink layer is formed by mixing a white ink and a metal oxide before stirring.

In the backlight module provided by the present disclosure, a light transmittance close to the first end of the ink layer is greater than a light transmittance away from the first end of the ink layer.

The present disclosure further provides a display device comprising a backlight module. The backlight module comprises a substrate, wherein the substrate comprises a first end and a second end oppositely arranged; an ink layer, wherein the ink layer is disposed on the substrate, and the ink layer comprises a plurality of hollow-carved units arranged gradually from the first end to the second end; and a plurality of light-emitting units, wherein at least two light-emitting units are disposed on the ink layer in an array arrangement.

In the display device provided by the present disclosure, in a column of the hollow-carved units in a direction perpendicular to a direction from the first end to the second end, a number of the hollow-carved units gradually decreases from the first end to the second end.

In the display device provided by the present disclosure, in two adjacent columns of the hollow-carved units, an interval between two adjacent hollow-carved units in a same column close to the first end is less than an interval between two adjacent hollow-carved units in a same column away from the first end.

In the display device provided by the present disclosure, in a column of the hollow-carved units in a direction perpendicular to a direction from the first end to the second end, an area of any one of the hollow-carved units gradually decreases from the first end to the second end.

In the backlight module provided by the present disclosure, a ratio of a sum of an area of the hollow-carved units in a same column at the second end to a sum of an area of the hollow-carved units in a same column at the first end ranges from 0.05 to 0.3.

In the display device provided by the present disclosure, the backlight module comprises an optical film, the optical film is disposed on the light-emitting units, and is used for transmitting light emitted by the light-emitting unit.

In the display device provided by the present disclosure, the optical film comprises a plurality of dot structures distributed in an array, and at least one of the light-emitting units corresponds to a center of the dot structures distributed in the array.

In the display device provided by the present disclosure, the dot structure comprises a plurality of protrusions, and at least two of the protrusions are arranged in an array.

In the display device provided by the present disclosure, the ink layer is formed by mixing a white ink and a metal oxide before stirring.

In the display device provided by the present disclosure, a light transmittance close to the first end of the ink layer is greater than a light transmittance away from the first end of the ink layer.

A current of mini light-emitting diode (LED) backlight modules is injected through a single aspect. As a distance of wirings increases, IR drop will occur, so that the brightness of the backlight module close to the power inlet is greater than the brightness of the backlight module away from the power inlet, resulting in an uneven display of the brightness in the surface of the backlight module. The backlight module provided by the present disclosure is provided with the ink layer with hollow-carved units arranged on the substrate so that the light emitted by the light-emitting unit and light reflected by the optical film are partially absorbed by the hollow-carved unit. Since the hollow-carved units are arranged in a gradual arrangement, which is configured to reduce emissivity of light, a reflectance of light at a light intense position is less than a reflectance of the light at a light weak position, thereby relieving the problem of the uneven brightness of the brightness in the surface of the backlight module.

In addition, the present disclosure provides a white ink layer on the substrate. Since the ink layer has a high reflectivity, it can reflect the light emitted by the light-emitting unit to the optical film. The ink layer can also reflect the light reflected by the optical film to the ink layer again to the optical film, thereby improving light utilization rate. Moreover, in the present disclosure, the ink layer is directly disposed on the substrate, which can replace current reflection sheets and save production cost.

Finally, the backlight module of the present disclosure further comprises the optical film, and the optical film is provided with a dot structure with protrusions of different heights. When a height of the protrusion is lesser, it is conducive to diffusion of light; and when the height of the protrusion is greater, it is conducive to concentration of light, so that a light source of a display surface emits light evenly.

DETAILED DESCRIPTION OF PREFERRED EMBODIMENTS

Figure 1:
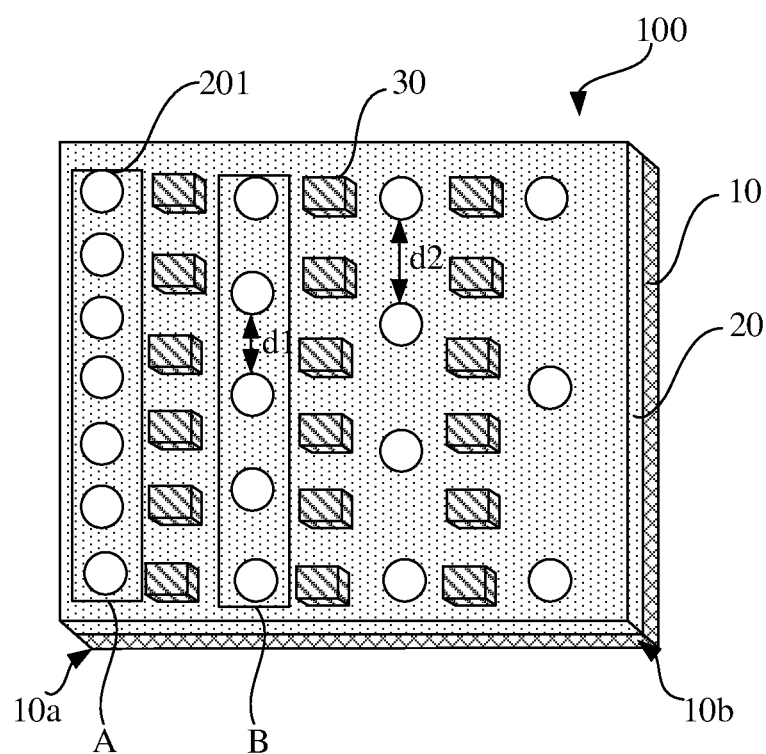
FIG. 1 is a schematic structural diagram of a backlight module provided by an embodiment of the present disclosure.

In order to make objectives, technical solutions, and advantages of the present disclosure clearer, the present disclosure will be further described in detail below with reference to drawings. Please refer to the drawings, in which the same component symbols represent the same components, following description is based on the specific embodiment of the present disclosure shown, which should not be considered as limiting other specific embodiments of the present disclosure not detailed here.

In descriptions of the present disclosure, it should be noted that, orientations or position relationships indicated by the terms, such as "center", "longitudinal", "transverse", "length", "width", "thickness", "upper", "lower", "front", "back", "left", "right", "vertical", "horizontal", "top", "bottom", "inside", "outside", "clockwise", "counterclockwise", etc. are based on the orientations or position relationships shown in the drawings. These are only convenience for describing the present disclosure and simplifying the descriptions, and does not indicate or imply that the device or element must have a specific orientation, a structure and an operation in the specific orientation, so it cannot be understood as a limitation on the present disclosure. In addition, the terms "first" and "second" are used for describing purposes only, and cannot be understood as indicating or implying relative importance or implicitly indicating the number of technical features indicated. Thus, the features defined as "first" and "second" may explicitly or implicitly include one or more of the features. In the descriptions of the present disclosure, the meaning of "plurality" is two or more, unless it is specifically defined otherwise.

In the present disclosure, the terms "mounting", "connected", "fixed" and the like should be broadly understood unless expressly stated or limited otherwise. For example, it may be fixed connected, removably connected, or integrated; it may be mechanically connected, or an electrically connected; it may be directly connected, or indirectly connected through an intermediary; it may be a connection between two elements or an interaction between two elements. For those skilled in the art, the specific meanings of the above terms in the present disclosure may be understood based on specific situations.

Figure 2:
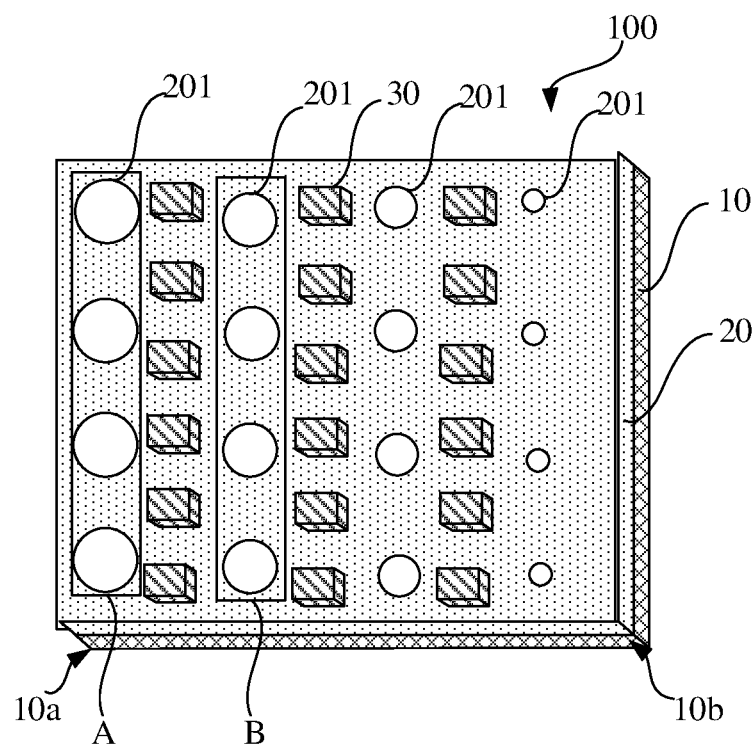
FIG. 2 is another schematic structural diagram of the backlight module provided by the embodiment of the present disclosure.

Refer to FIG. 1 or FIG. 2, an embodiment of the present disclosure provides a backlight module, the backlight module 100 comprises a substrate 10, an ink layer 20, and a plurality of light-emitting units 30. Wherein, the substrate 10 comprises a first end 10a and a second end 10b oppositely arranged. The ink layer 20 is disposed on the substrate 10, and the ink layer 20 comprise a plurality of hollow-carved units 201 arranged gradually from the first end 10a to the second end 10b. At least two light-emitting units 30 are arranged on the ink layer 20 in an array. Wherein, the substrate 10 is a glass substrate or a flexible substrate. The light-emitting unit 30 comprises a mini light-emitting diode (mini LED) light-emitting unit. Wherein, the backlight module 100 comprises a direct illumination-type mini LED backlight module.

It should be noted that the substrate 10 at the hollow-carved unit 201 in the embodiment of the present disclosure is exposed, that is, the hollow-carved unit 201 is an upper surface of the substrate 10. A shape of the hollow-carved unit 201 is round or square, but it is not limited herein; for example, it can also be oval, honeycomb, or triangular, etc.

The ink layer 20 with the hollow-carved unit 201 is formed by an inkjet printing process. Specifically, a computer-aided design (CAD) drawing file with coordinates of the hollow-carved unit 201 is imported into a software, and an inkjet printing device prints out the ink layer with the hollowing unit 201 according to the drawing file. In order to make a thickness of the ink layer uniform, the ink layer 20 is formed by at least one inkjet printing process. In the present disclosure, the ink layer 20 with the hollow-carved unit 201 is directly formed by the inkjet printing process, which can not only effectively improve manufacturing efficiency, but also save production cost. In addition, the ink layer 20 with the hollow-carved unit 201 formed by inkjet printing has high reliability and stability.

Furthermore, referring to FIG. 1, in a column of the hollow-carved units 201 in a direction perpendicular to a direction from the first end 10a to the second end 10b, a number of the hollow-carved units 201 gradually decreases from the first end 10a to the second end 10b, that is, a hollow-carved density gradually decreases from the first end 10a to the second end 10b.

Furthermore, in two adjacent columns of the hollow-carved units 201, an interval d1 between two adjacent hollow-carved units 201 in a same column close to the first end 10a is less than an interval d2 between two adjacent hollow-carved units 201 in a same column away from the first end 10a. In any column of hollow-carved units 201, the hollow-carved units 201 are evenly arranged.

Moreover, referring to FIG. 2, in a column of the hollow-carved 201 units in the direction perpendicular to the direction from the first end 10a to the second end 10b, an area of any one of the hollow-carved units 201 gradually decreases from the first end 10a to the second end 10b, that is, in any column of the hollow-carved units 201 in a vertical direction where the first end 10a points to a direction of the second end 10b, while keeping a number of the hollow-carved units 201 in each column unchanged, the area of any hollow-carved unit 201 gradually decreases from the first end 10a to the second end 10b.

Furthermore, a ratio of a sum of an area of the hollow-carved units 201 in a same column at the second end 10b to a sum of an area of the hollow-carved units 201 in a same column at the first end 10a ranges from 0.05 to 0.3. For example, the ratio of the sum of the area of the hollow-carved units 201 in the same column at the second end 10b to the sum of the area of the hollow-carved units 201 in the same column at the first end 10a is any one of 0.05, 0.1, 0.15, 0.2, 0.25, or 0.30, that is, the ratio of the sum of the area of the hollow-carved units 201 in the same column at the second end 10b where the light is weak to the sum of the area of the hollow-carved units 201 in the same column at the first end 10a where the light is intensive ranges from 0.05 to 0.3. It should be noted that in the embodiment of the present disclosure, the same column of hollow-carved units 201 at the first end 10a refers to the same column of hollow-carved units 201 closest to the first end, that is, an area with the largest sum of regions of the hollow-carved units 201. The same column of hollow-carved units 201 at the second end 10b refers to the same column of hollow-carved units 201 closest to the second end, that is, an area with the smallest sum of regions of the hollow-carved units 201.

Figure 3:
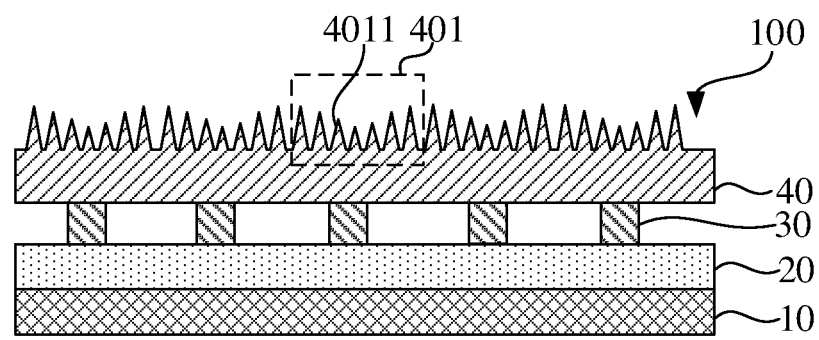
FIG. 3 is a schematic cross-sectional view of the backlight module provided by the embodiment of the present disclosure.
Figure 4:
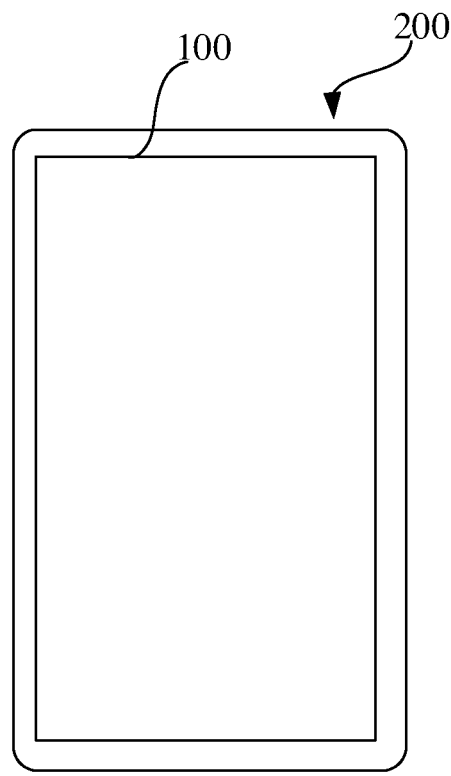
FIG. 4 is a schematic diagram of a display device provided by the embodiment of the present disclosure.

Furthermore, referring to FIG. 3, the backlight module 100 further comprises an optical film 40, the optical film 40 is disposed on the light-emitting unit 30, and is used for transmitting light emitted by the light-emitting unit 30. Wherein, the optical film 40 comprises a plurality of dot structures 401 distributed in an array, and at least one of the light-emitting units 30 corresponds to a center of the dot structures 401 distributed in an array, wherein the dot structure 401 is disposed on a side of the optical film away from the light-emitting unit 30. The dot structure 401 is configured to diffuse light of the light-emitting unit 30. A shape of the dot structure 401 comprises cones, spheres, etc.

Furthermore, referring to FIG. 3, the dot structure 401 comprises a plurality of protrusions 4011, and at least two of the protrusions 4011 are arranged in an array. It should be noted that in the embodiment of the present disclosure, a height of the protrusion 4011 close to the light-emitting unit 30 is less than a height of the protrusion 4011 away from the light-emitting unit 30. Its function is that due to a greater light intensity close to the light-emitting unit 30, when the height of the protrusion is lesser, it is conducive to diffusion of light; and when the height of the protrusion is greater, it is conducive to concentration of light, so that a light source of a display surface emits light evenly. The optical film is made of light-transmitting materials, specifically, comprising glass, polymethylmethacrylate, polycarbonate, etc. Moreover, a convex lens is disposed on a side of the optical film 40 close to the light-emitting unit 30 for collecting light emitted by the light-emitting unit 30.

It should be noted that referring to FIG. 1 or FIG. 2, on the ink layer 20 with the hollow-carved unit 201, a light transmittance T1 of any adjacent first region A is greater than a light transmittance T2 of a second region B, that is, a light transmittance of the first region A close to the first end is greater than a light transmittance of the second region B away from the first end. Wherein, a ratio of T1 and T2 ranges from 1 to 2 (excluding 1), preferably, the ratio of T1 and T2 ranges from 1 to 1.1 (excluding 1); for example, the ratio of T1 and T2 is any one of 1.01, 1.02, 1.03, 1.04, 1.05, 1.06, 1.06, 1.07, 1.08, 1.09, or 1.1. Furthermore, on any of the first region A and the second region B, a light intensity received by the first region A is N % greater than a light intensity received by the second region B, then a hollow-carved area of the first region A is greater than a hollow-carved area of the second region B by N %. It should be noted that the light intensity received by the first region A is N % greater than the light intensity received by the second region B is at least one of the light emitted by the light-emitting unit 30 or the light reflected by the optical film 40. Wherein, value range of N % depends on actual light emission of the backlight module 100.

A current of the mini LED backlight modules is injected through a single aspect. As a distance of wirings increases, IR drop will occur, so that the brightness of the backlight module close to the power inlet is greater than the brightness of the backlight module away from the power inlet, resulting in an uneven display of the brightness in the surface of the backlight module. In the present disclosure, the substrate 10 at the hollow-carved unit 201 is directly exposed, so that a hollow-carved density at a position where the light is intensive is greater than a hollow-carved density at a position where the light is weak, thereby reducing reflection of light and realizing uniform light emission inner the backlight module.

It should be noted that the backlight module 100 in the embodiment of the present disclosure further comprises a driving circuit, wherein the first end 10a is disposed at a driving end of the driving circuit.

A description of the backlight module 100 in a display device 200 is as above, and will not be described here.

It should be noted that the display device in the embodiment of the present disclosure may be any component comprising a backlight module 100 such as an electronic paper, a mobile phone, a tablet computer, a television, a display, a notebook computer, a digital photo frame, or a navigator.

A current of mini light-emitting diode (LED) backlight modules is injected through a single aspect. As a distance of wirings increases, IR drop will occur, so that the brightness of the backlight module close to the power inlet is greater than the brightness of the backlight module away from the power inlet, resulting in an uneven display of the brightness in the surface of the backlight module. The backlight module provided by the present disclosure is provided with the ink layer with hollow-carved units arranged on the substrate so that the light emitted by the light-emitting unit and light reflected by the optical film are partially absorbed by the hollow-carved unit. Since the hollow-carved units are arranged in a gradual arrangement, which is configured to reduce emissivity of light, so that a reflectance of light at a light intense position is less than a reflectance of the light at a light weak position, thereby relieving the problem of the uneven brightness of the brightness in the surface of the backlight module.

In addition, the present disclosure provides a white ink layer on the substrate. Since the ink layer has a high reflectivity, it can reflect the light emitted by the light-emitting unit to the optical film. The ink layer can also reflect the light reflected by the optical film to the ink layer again to the optical film, thereby improving light utilization rate. Moreover, in the present disclosure, the ink layer is directly disposed on the substrate, which can replace current reflection sheets and save production cost.

Finally, the backlight module of the present disclosure further comprises the optical film, and the optical film is provided with a dot structure with protrusions of different heights. When a height of the protrusion is lesser, it is conducive to diffusion of light; and when the height of the protrusion is greater, it is conducive to concentration of light, so that a light source of a display surface emits light evenly.

As mentioned above, while the present disclosure has been disclosed via preferred embodiments as above, the preferred embodiments are not intended to limit the disclosure. Those skilled in the art can make various modifications and alternations without departing from the spirit and scope of the disclosure. The scope of protection of the disclosure is defined by the claims.

What is claimed is:

1. A backlight module, comprising:
    a substrate comprising a first end and a second end arranged opposite to each other;
    an ink layer disposed on the substrate and comprising a plurality of hollow-carved units arranged in a reduced density from the first end to the second end; and
    a plurality of light-emitting units disposed on the ink layer in an array arrangement.

2. The backlight module as claimed in claim 1, wherein in each column of the hollow-carved units in a direction perpendicular to a direction from the first end to the second end, a number of the hollow-carved units in each column is gradually reduced from the first end to the second end.

3. The backlight module as claimed in claim 2, wherein in two adjacent columns of the hollow-carved units, an interval between two adjacent hollow-carved units in a same column closer to the first end is less than an interval between another two adjacent hollow-carved units in a same column farther from the first end.

4. The backlight module as claimed in claim 1, wherein in each column of the hollow-carved units in a direction perpendicular to a direction from the first end to the second end, an area of the hollow-carved units in each column is gradually reduced from the first end to the second end.

5. The backlight module as claimed in claim 1, wherein a ratio of a sum of an area of the hollow-carved units in a same column at the second end to a sum of an area of the hollow-carved units in a same column at the first end ranges from 0.05 to 0.3.

6. The backlight module as claimed in claim 1, wherein the backlight module further comprises an optical film disposed on the light-emitting units and used for transmitting light emitted by the light-emitting units.

7. The backlight module as claimed in claim 6, wherein the optical film comprises a plurality of dot structures distributed in an array, and at least one of the light-emitting units corresponds to a center of the dot structures distributed in the array.

8. The backlight module as claimed in claim 7, wherein the dot structures comprise a plurality of protrusions, and at least two of the protrusions are arranged in an array.

9. The backlight module as claimed in claim 1, wherein the ink layer is formed by mixing a white ink and a metal oxide.

10. The backlight module as claimed in claim 1, wherein a light transmittance of the ink layer closer to the first end is greater than a light transmittance of the ink layer farther from the first end.

11. A display device, comprising a backlight module, wherein the backlight module comprises:
    a substrate comprising a first end and a second end arranged opposite to each other;
    an ink layer disposed on the substrate and comprising a plurality of hollow-carved units arranged in a reduced density from the first end to the second end; and
    a plurality of light-emitting units disposed on the ink layer in an array arrangement.

12. The display device as claimed in claim 11, wherein in each column of the hollow-carved units in a direction perpendicular to a direction from the first end to the second end, a number of the hollow-carved units in each column is gradually reduced from the first end to the second end.

13. The display device as claimed in claim 12, wherein in two adjacent columns of the hollow-carved units, an interval between two adjacent hollow-carved units in a same column closer to the first end is less than an interval between another two adjacent hollow-carved units in a same column farther from the first end.

14. The display device as claimed in claim 11, wherein in each column of the hollow-carved units in a direction perpendicular to a direction from the first end to the second end, an area of the hollow-carved units in each column is gradually reduced from the first end to the second end.

15. The display device as claimed in claim 11, wherein a ratio of a sum of an area of the hollow-carved units in a same column at the second end to a sum of an area of the hollow-carved units in a same column at the first end ranges from 0.05 to 0.3.

16. The display device as claimed in claim 11, wherein the backlight module further comprises an optical film disposed on the light-emitting units and used for transmitting light emitted by the light-emitting units.

17. The display device as claimed in claim 16, wherein the optical film comprises a plurality of dot structures distributed in an array, and at least one of the light-emitting units corresponds to a center of the dot structures distributed in the array.

18. The display device as claimed in claim 17, wherein the dot structures comprise a plurality of protrusions, and at least two of the protrusions are arranged in an array.

19. The display device as claimed in claim 11, wherein the ink layer is formed by mixing a white ink and a metal oxide.

20. The display device as claimed in claim 11, wherein a light transmittance of the ink layer closer to the first end is greater than a light transmittance of the ink layer farther from the first end.

\* \* \* \* \*